(12) United States Patent
Greenlaw

(10) Patent No.: US 11,572,843 B2
(45) Date of Patent: Feb. 7, 2023

(54) MULTIPLE FUEL TANK PURGE SYSTEM AND METHOD

(71) Applicant: Clarence Greenlaw, Easley, SC (US)

(72) Inventor: Clarence Greenlaw, Easley, SC (US)

(*) Notice: Subject to any disclaimer, the term of this patent is extended or adjusted under 35 U.S.C. 154(b) by 307 days.

(21) Appl. No.: 16/582,542

(22) Filed: Sep. 25, 2019

(65) Prior Publication Data

US 2021/0087982 A1   Mar. 25, 2021

(51) Int. Cl.
| | |
|---|---|
| *F02D 19/06* | (2006.01) |
| *F02D 41/00* | (2006.01) |
| *B60K 15/035* | (2006.01) |
| *B60K 15/063* | (2006.01) |
| *F02D 33/00* | (2006.01) |
| *F02M 37/00* | (2006.01) |
| *B60K 15/04* | (2006.01) |
| *B60K 15/03* | (2006.01) |

(52) U.S. Cl.
CPC ........ *F02D 19/0621* (2013.01); *B60K 15/035* (2013.01); *B60K 15/0406* (2013.01); *B60K 15/063* (2013.01); *F02D 19/0657* (2013.01); *F02D 19/0665* (2013.01); *F02D 19/0676* (2013.01); *F02D 33/006* (2013.01); *F02M 37/0064* (2013.01); *B60K 2015/0319* (2013.01); *B60K 2015/03118* (2013.01); *B60K 2015/03236* (2013.01); *B60K 2015/03302* (2013.01); *B60K 2015/03355* (2013.01); *B60K 2015/03547* (2013.01); *B60K 2015/0438* (2013.01); *B60K 2015/0636* (2013.01); *B60K 2015/0638* (2013.01)

(58) Field of Classification Search
CPC .. F02D 41/0025; F02D 19/081; F02D 19/084; F02D 19/0665; F02D 19/0613; F02D 19/0694

See application file for complete search history.

(56) References Cited

U.S. PATENT DOCUMENTS

| | | |
|---|---|---|
| 1,541,851 A | 6/1925 | Ristau, Jr. |
| 4,305,350 A | 12/1981 | Brown et al. |
| 4,403,589 A | 9/1983 | Bowen et al. |
| 4,437,448 A | 3/1984 | Billingsley |
| 4,462,346 A | 7/1984 | Haman et al. |
| 4,594,201 A | 6/1986 | Phillips et al. |
| 4,640,234 A | 2/1987 | Olsson et al. |
| 5,092,305 A | 3/1992 | King |
| 5,181,488 A | 1/1993 | Sakurai |

(Continued)

*Primary Examiner* — Long T Tran
(74) *Attorney, Agent, or Firm* — Southeast IP Group; Thomas L. Moses

(57) ABSTRACT

A multiple fuel tank purge system and method includes providing a pair of fuel tanks, including a main fuel tank for containing impure fuel and a separate, auxiliary fuel tank that contains commercial canned fuel. The engine runs on the impure fuel from the main fuel tank while the engine is in normal use, and then employs a shutdown cycle that switches to the commercial canned fuel from the auxiliary fuel tank for some pre-set time period. This arrangement allows the engine to be purged of the impure fuel (by burning the impure fuel during the shutdown cycle) and replaced by the commercial pre-mixed fuel before the engine is finally shut down. The system may further include a novel fuel cap with a fuel line, a tank within a tank fuel container, and/or an electronically actuated shutdown cycle mechanism.

13 Claims, 5 Drawing Sheets

(56) References Cited

U.S. PATENT DOCUMENTS

| | | | | |
|---|---|---|---|---|
| 5,901,687 | A | * | 5/1999 | Tasaki .................... F02B 63/02 220/367.1 |
| 5,951,050 | A | | 9/1999 | Siekmann |
| 6,135,426 | A | | 10/2000 | Wargolet et al. |
| 7,228,841 | B2 | | 6/2007 | Takemoto et al. |
| 7,627,416 | B2 | | 12/2009 | Batenburg et al. |
| 9,695,764 | B1 | | 7/2017 | Christiansen et al. |
| 2005/0039727 | A1 | * | 2/2005 | Porter .................... F02M 37/10 123/509 |
| 2005/0072471 | A1 | | 4/2005 | Choi |
| 2005/0106420 | A1 | * | 5/2005 | Kurose .................... G11B 5/73 428/844.1 |
| 2005/0109420 | A1 | * | 5/2005 | Patten .................... B60K 15/03 141/18 |
| 2008/0000916 | A1 | | 1/2008 | Hwang |
| 2008/0053399 | A1 | * | 3/2008 | Bromberg ............. F02D 19/081 123/304 |
| 2008/0053413 | A1 | * | 3/2008 | Donahue ................ A01D 34/82 123/188.1 |
| 2009/0076705 | A1 | | 3/2009 | Colesworthy et al. |
| 2010/0024789 | A1 | * | 2/2010 | Lippa .................. F02D 19/0665 123/577 |
| 2010/0147262 | A1 | * | 6/2010 | Martin ................ F02D 41/0025 123/299 |
| 2010/0230001 | A1 | * | 9/2010 | Elwart ................ B60K 15/073 141/35 |
| 2011/0120569 | A1 | * | 5/2011 | Bromberg ............. F02D 19/081 137/98 |
| 2014/0007842 | A1 | * | 1/2014 | Kudo .................. F02D 19/0671 123/445 |
| 2016/0341141 | A1 | * | 11/2016 | Dudar .................... F02D 41/22 |
| 2016/0368373 | A1 | * | 12/2016 | Dudar .................. B60K 15/077 |
| 2017/0356408 | A1 | * | 12/2017 | Yang .................... G01L 5/0052 |

\* cited by examiner

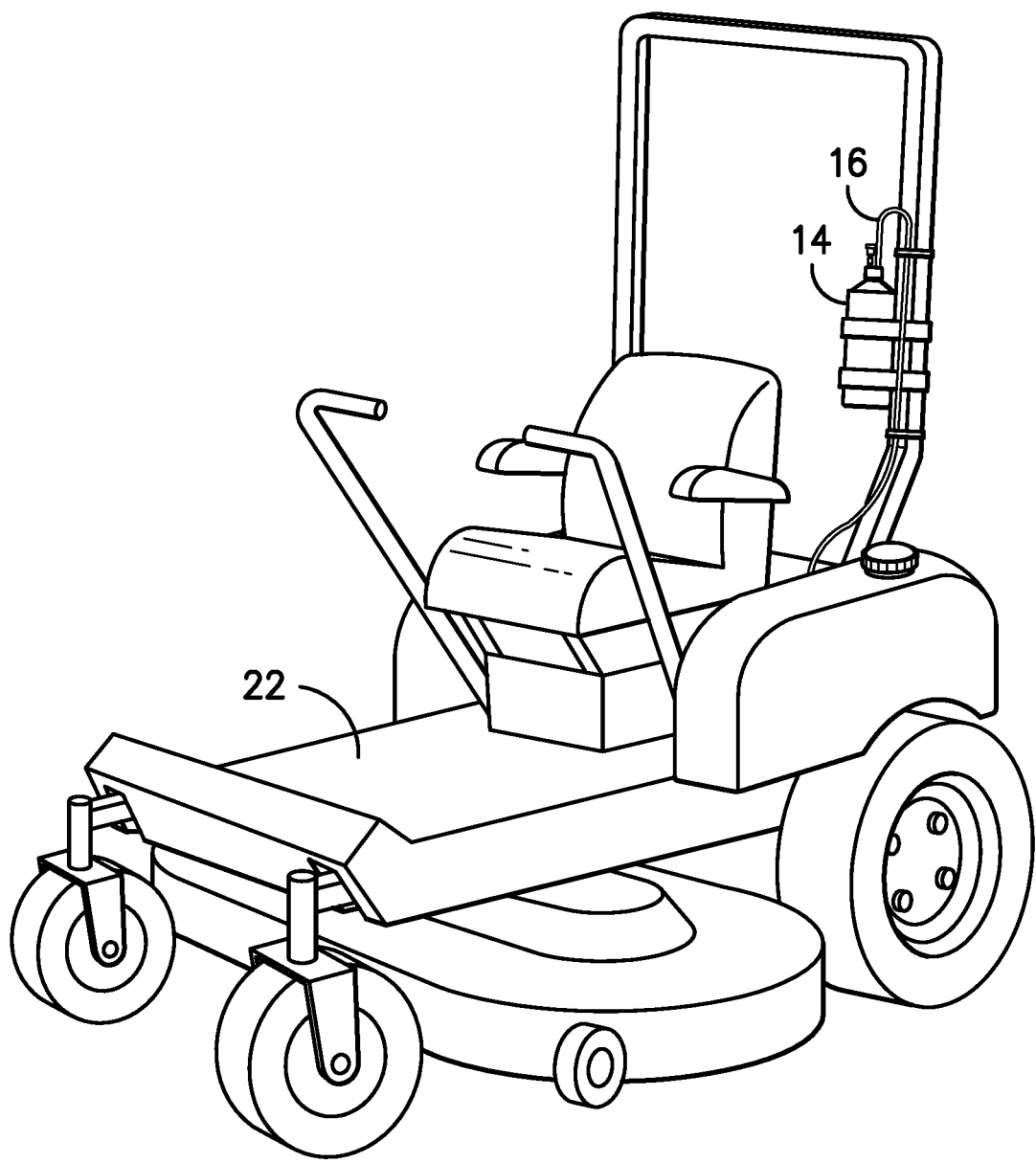
FIG. -1-

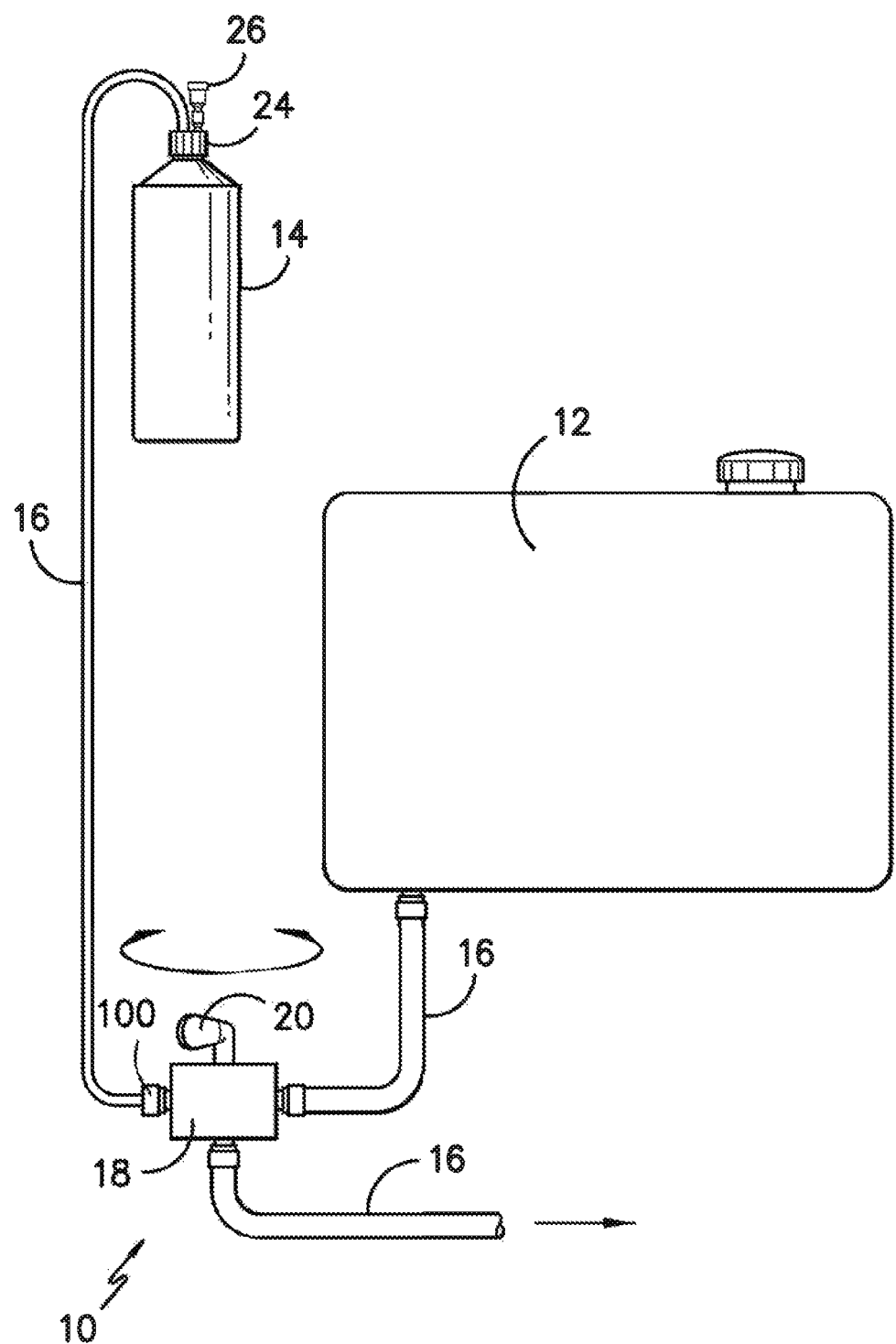
FIG. -2-

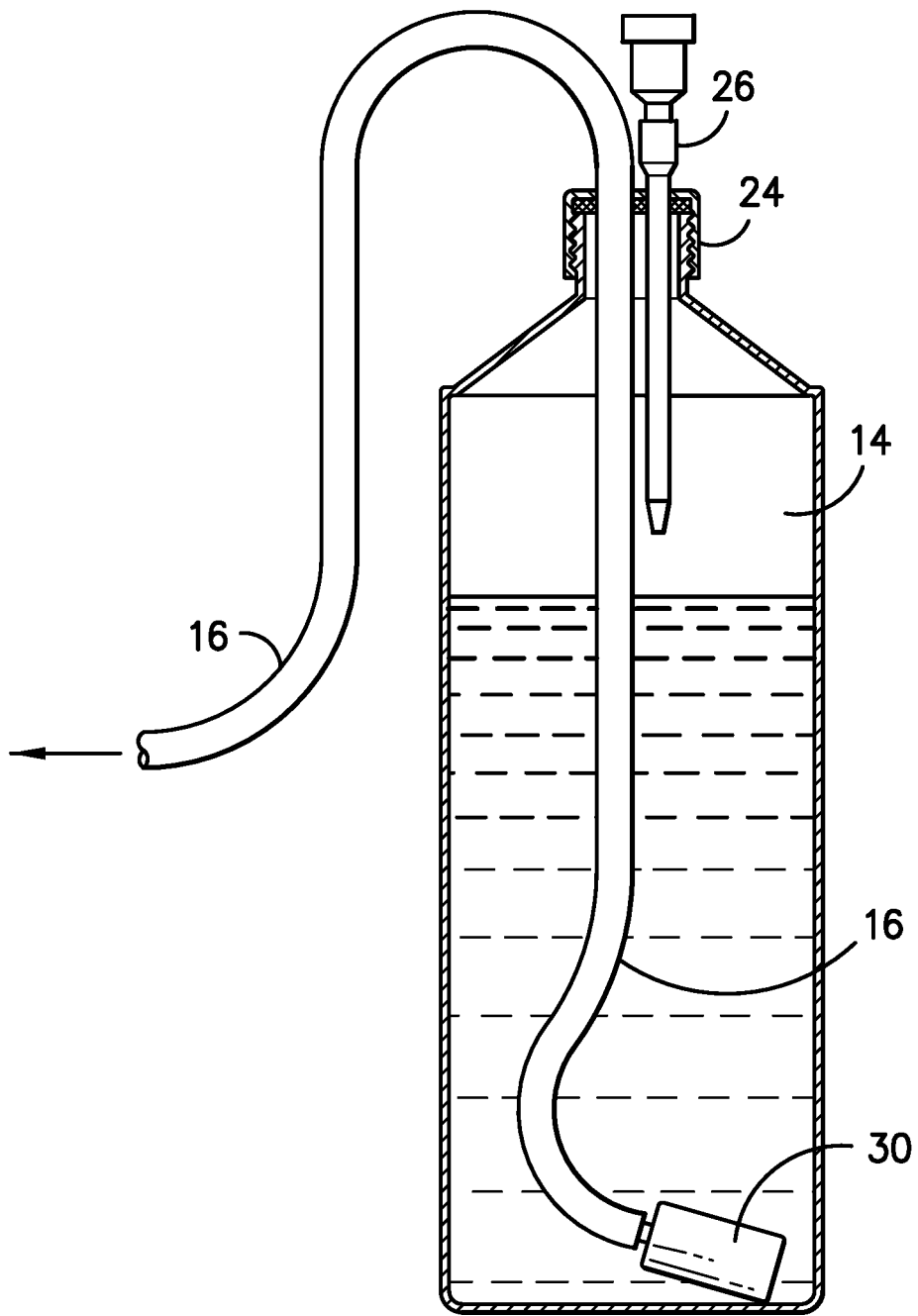
FIG. -3-

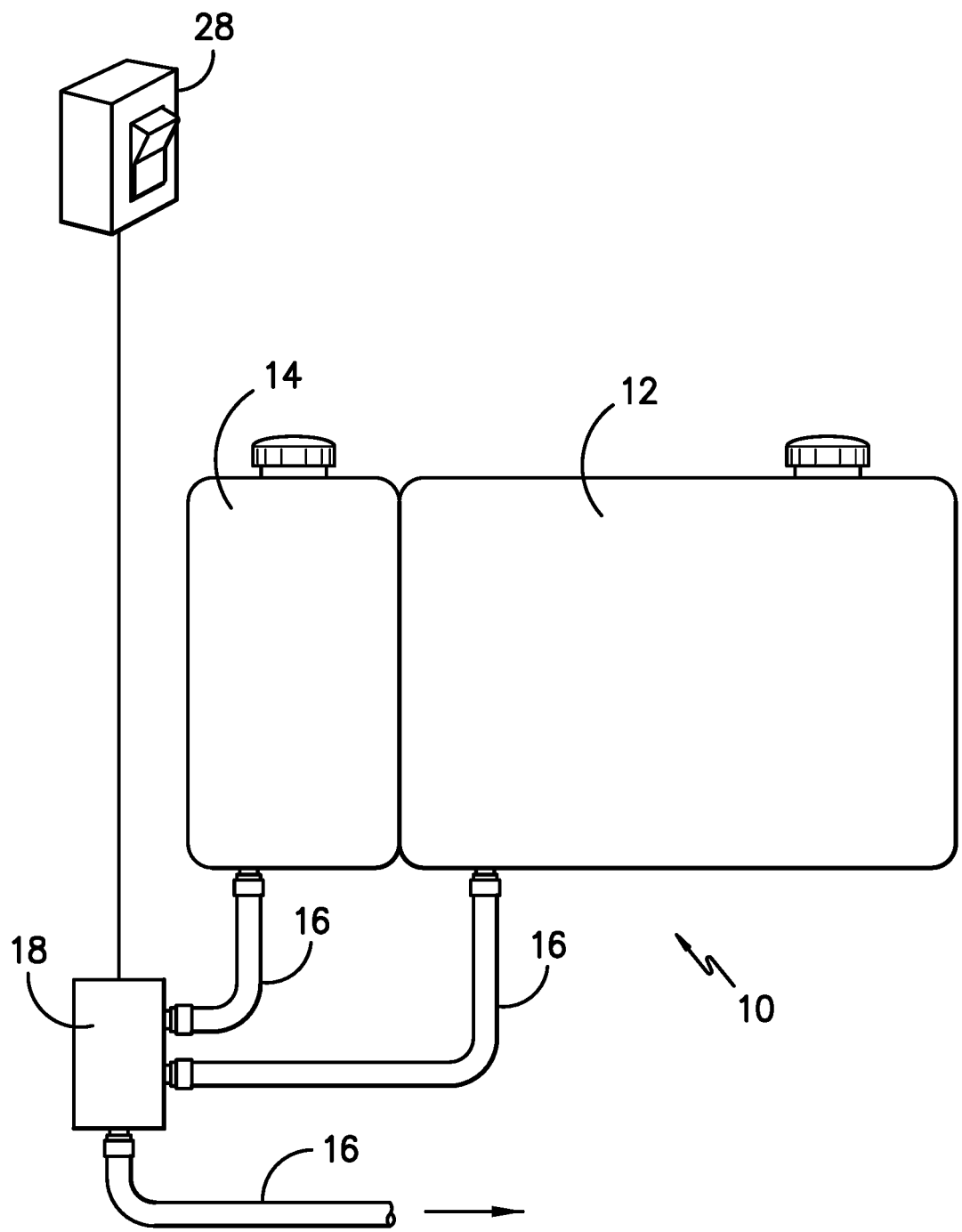
FIG. -4-

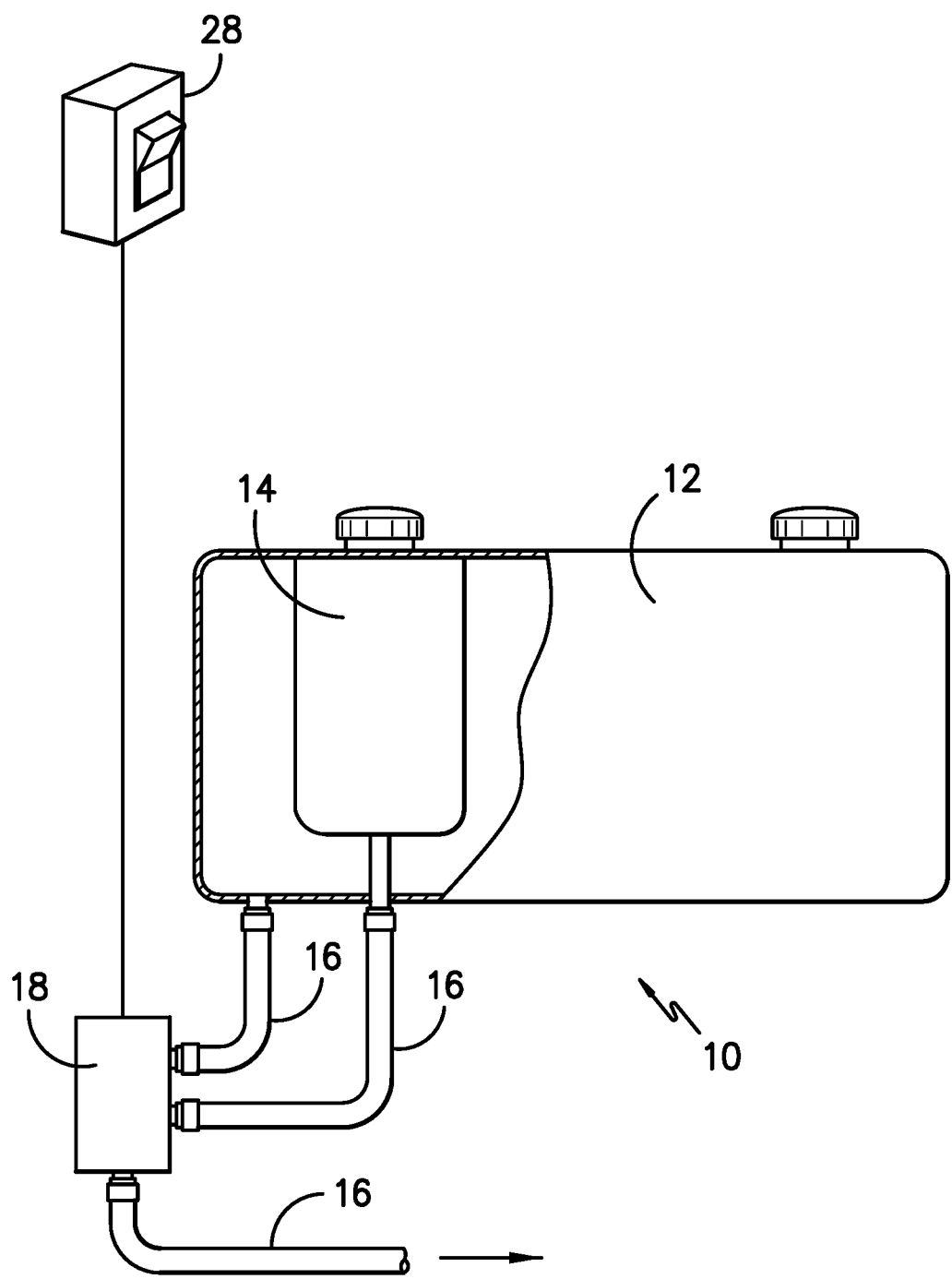
FIG. -5-

MULTIPLE FUEL TANK PURGE SYSTEM AND METHOD

BACKGROUND OF THE INVENTION

In recent years, as a result of government mandates, ethanol has become a significant component of gasoline in the United States. Additionally, for various reasons, the quality of gasoline sold across the country has been in decline, which has caused countless problems in combustion engines, including automobile engines, boat motors, lawn mowers and yard equipment, and the like. Further, even if these combustion engines initially run well on gasoline from the pump, various problems surface when the engine is left to sit for extended periods of time. Gasoline having ethanol or other impurities (sometimes including water or sludge and collectively referred to herein as 'impure gasoline' 'impure fuel' or 'impure gas') causes issues with fuel lines, spark plugs, carburetors, and other components, which prevents the engine from running well, or from running at all.

As a result of these problems caused by impure gasoline left in a combustible engine over long periods of non-use, some companies are selling canned gasoline or canned pre-mixed gasoline that contains oil at a specific ratio, such as 50:1 gasoline to oil, or 40:1 gasoline to oil, and contains a fuel stabilizer, but does not contain ethanol or other impurities (referred to herein collectively as 'commercial canned gasoline' or 'commercial canned fuel'). For example, Husqvarna sells commercial pre-mixed gasoline in specific ratios for use with 2-stroke engines that are commonly used in small engines for lawn equipment such as weed trimmers, chainsaws, lawnmowers and the like. This commercial pre-mixed gasoline is significantly more expensive than impure gas from a convenience station pump, but is recommended by many dealers as a preventive measure to guard against the constant repairs and maintenance that results from using impure gasoline in their equipment.

For larger equipment, such as commercial grade lawn mowers, it may be economically infeasible to use the commercial canned gasoline constantly, due to the high cost of that fuel coupled with the high volume of fuel required for such equipment. Therefore, it would be desirable to provide a system that allows a combustion engine to use impure fuel for a particular job, and to purge the impure fuel from the engine, fuel lines and systems prior to shutting the engine down. Such a system would allow the impure fuel to be purged from the engine and replaced with commercial canned gasoline prior to engine shutdown, so that if the engine sits without running for an extended period of time, the engine and its components are not exposed to impure gasoline during that extended period.

The system and method disclosed herein, in one embodiment, utilizes a pair of fuel tanks, each of which provides fuel to the engine. The main fuel tank contains impure fuel, and the auxiliary tank contains commercial canned fuel. Many different engines have been developed to run on multiple fuel sources. Typically, these engines are designed to run on either gasoline or diesel fuel, and may also operate on liquid natural gas, propane, or some other pressurized fuel. The following references show various examples of such multi-fuel engines and systems, and each of these references are hereby incorporated herein, in their entireties:

U.S. Pat. No. 4,305,350 Dual Fuel System

A dual fuel system is disclosed which, when retrofitted to a standard gasoline engine of an automobile, permits the automobile to run on one of two fuels. The dual fuel system comprises two fuel tanks; two carburetors, each connected to a fuel tank and powered by a separate fuel pump; a venturi housing communicating with the carburetors and forming two venturi throats, each throat in registry with an outlet of a carburetor; an adapter forming a single passage therethrough and including an end adapted to be mounted on an intake manifold such that the passage is in registry with an intake opening in the intake manifold; a valve, located in between the venturi housing and the adapter means, for alternately opening and closing a pathway from a preselected venturi throat to the single passage of the adapter so that only one venturi throat communicates with the single passage at a time; a single throttle linkage connected to the throttles of the carburetors such that the throttles of the carburetors operate in unison; a valve linkage which allows remote control of the valve; and a slave linkage extending between the valve linkage and a distributor which is driven by the valve linkage and automatically adjusts the distributor to a predetermined setting by advancing or retarding the timing. The venturi housing may further include an exhaust gas heated helical duct for preheating the air-fuel mixture passing therethrough.

U.S. Pat. No. 4,403,589 Spare Tank System for Motor Vehicle

A spare tank system for a motor vehicle is provided which may conveniently be coupled into the normal fuel line of the vehicle, and which comprises a conduit in which a valve and a fitting are mounted. During normal operation of the motor vehicle, the valve is in a first operating position, and the fuel from the normal fuel system flows through the fuel line and through the conduit to the engine without being impeded in any way. One or more closed cylinders, or other pressurized containers of fuel, such as gasoline, are also provided which may normally be carried in the trunk of the vehicle. Should the vehicle run out of gas, the valve is set to a second operating position, and the nozzle of the container is inserted into the fitting, so that fuel from the container may now flow through the conduit to the engine, with the normal fuel system being shut off.

U.S. Pat. No. 4,437,448 Dual Fuel Supply System

Disclosed herein is a fuel supply system comprising a carburetor including an air/fuel induction passage including a main supply jet and a secondary orifice, a first float bowl having an auxiliary outlet and communicating with the main jet, and a first float controlled valve communicable with a source of a first fuel and operable to control supply of the first fuel to the first float bowl, a combined auxiliary float bowl and primer comprising a housing including a second float bowl, a cavity, a duct extending between the cavity and the second float bowl, a second float controlled valve communicable with a source of a second fuel and operable to control supply of the second fuel to the second float bowl, a movable wall located in the cavity and defining a primer fuel chamber which can be varied in volume and which communicates with the duct, a handle connected to the movable wall for displacing the movable wall to vary the volume of the primer fuel chamber, a check valve in the duct permitting flow from the second float bowl and preventing return flow to the second float bowl, and an outlet communicating with the duct between the primer fuel chamber and the check valve, and a control valve connected to the secondary orifice, to the auxiliary outlet of the first float bowl, and to the outlet of the combined auxiliary float bowl and primer and including a valve member movable between a first position communicating the secondary orifice with the outlet and disconnecting the secondary orifice from the auxiliary outlet and a second position communicating the secondary orifice with the auxiliary outlet and disconnecting the secondary orifice from the outlet.

U.S. Pat. No. 4,462,346 Dual Fuel System for Internal Combustion Engine

Disclosed herein is an internal combustion engine comprising a crankcase, a cylinder extending from the crankcase and having an inlet port, a piston located in the cylinder, a transfer passage located between the crankcase and the cylinder inlet port, a fuel pump adapted to communicate with a source of fuel for normal operation, a carburetor having an air induction passage communicating with the crankcase and including a venturi, which carburetor also includes a float bowl communicating with the fuel pump and a high speed nozzle communicating between the float bowl and the venturi, a low speed fuel nozzle communicating with the transfer passage adjacent the inlet port, and a fuel line communicating between the float bowl and the low speed nozzle and including therein check valve means preventing flow from the transfer passage to the float bowl and permitting flow from the float bowl to the transfer passage, which fuel line also includes fuel flow metering means.

U.S. Pat. No. 4,594,201 Multi-Fuel System for Internal Combustion Engines

A multi-fuel system which will operate the usual factory-manufactured gasoline powered internal combustion engine efficiently on any one of a number of different fuels without modifying or changing the engine. The system involves a non-venturi type of carburetor having a metered inlet and means for controlling the pressure of each fuel delivered to the inlet in accordance with the stoichiometric ratio of that fuel which assures that the proper fuel/air ratio is delivered to the mixing chamber of the carburetor without requiring any change in either the carburetor or engine when a different fuel is used. Additionally, the fuel delivered to the fuel inlet is then directed into the fuel/air mixing chamber without subjecting the fuel to the suction in the intake manifold of the engine.

U.S. Pat. No. 4,640,234 Method of Running an Internal Combustion Engine with Alternative Fuels A method of operating an internal combustion engine with alternative preheated fuels, or mixtures thereof, at the same compression ratio and supplied with an additional medium for the operation comprises detecting the flow of air drawn into the engine through the air intake, proportioning and distributing the fuel to each cylinder in response to at least detected flow, heating the fuel fed to each cylinder to a temperature between its flame temperature and above its evaporation temperature, but below its auto ignition temperature, and injecting the heated fuel and the additional medium in a controlled amount into each cylinder through separate feed means at different angles with respect to the wall of the respective cylinder.

U.S. Pat. No. 5,092,305 Apparatus and Method for Providing an Alternative Fuel System for Engines An alternative fuel system that operates in conjunction with the primary fuel system to utilize the output from the existing or original equipment manufacturer's control module from the primary system, modifies that signal and controls a fuel supply valve for the alternative fuel so that the proper quantity of alternative fuel is supplied to the engine.

U.S. Pat. No. 5,181,488 Two Different Fuel Feeder

A fuel supply system for an outboard motor having a main fuel supply for supplying fuel to the engine and an enrichment fuel supply for supplying a different fuel for starting and cold running. The enrichment fuel supply supplies fuel to the engine through a common enrichment control housing assembly that includes an enrichment pump and an enrichment fuel flow control which are both operated simultaneously. In addition, the enrichment fuel source has a vent system including a vent valve that is operated simultaneously with the enrichment fuel valve and the enrichment pump U.S. Pat. No. 5,951,050 Integral Reservoir for Tank The present invention is a system for storing and supplying a maximum amount of fuel from a fuel tank while maintaining a simple structure which is easy to gain access to and repair. The fuel tank structure includes a main fuel tank with an integral internal reservoir tank, a fuel pump, and primary and secondary fuel filters. The reservoir is permanently secured within the fuel tank and provides access, through a removable cover, to the fuel pump allowing efficient and cost effective maintenance to be performed whenever necessary. The system can be manufactured from a wide range of materials and is in compliance with the standards of the industry.

U.S. Pat. No. 6,135,426 Priming System for Internal Combustion Engines

The priming system for a dual feed internal combustion engine provides a lighter, starting fuel to the venturi, the fuel nozzle, or to the carburetor bowl for engine starting. In a first embodiment, the starting or secondary fuel is mixed with the primary fuel in the fuel bowl, and the pure secondary fuel is provided to the fuel nozzle by actuation of a manually-operable primer. In a second embodiment, the secondary fuel is mixed with the primary fuel in the carburetor fuel bowl, and a shot of pure secondary fuel is provided directly to the carburetor venturi by the actuation of a manually-operable primer. In a third embodiment, a primer is manually operated before engine starting to remove primary fuel from the carburetor bowl and return it to the primary fuel tank. Thereafter, pure secondary fuel is provided directly to the carburetor bowl for engine starting through a changeover valve. After the engine has started, the changeover valve is positioned to permit primary fuel to be gravity fed to the carburetor bowl.

U.S. Pat. No. 7,228,841 Fuel Switching for Dual Fuel Engine

An internal combustion engine combusts a first fuel or a second fuel. A method for controlling the engine comprises supplying first fuel to at least one combustion chambers of the internal combustion engine, stopping the supply of the first fuel to the combustion chamber in response to an engine operating condition, and fueling with the second fuel to the at least one combustion chamber after a predetermined period, so as to maintain an engine speed within a predetermined range.

U.S. Pat. No. 7,627,416 Method and Apparatus for Operating a Dual Fuel Internal Combustion Engine In an internal combustion engine that can burn two fuels, the main fuel may become unavailable, either temporarily or until the main fuel is replenished. The present apparatus determines when to fuel an engine with main fuel and secondary fuel, or secondary fuel alone. The apparatus includes a main-fuel supply system comprising a main-fuel injection valve that introduces main fuel into an engine combustion chamber; a secondary-fuel injection system comprising a secondary-fuel injection valve that introduces secondary fuel directly into the combustion chamber; a pressure sensor associated with the main-fuel supply system for determining injection pressure inside the main-fuel injection valve; and an electronic controller in communication with the pressure sensor and programmable to separately command actuation of the secondary-fuel and the main-fuel injection valve when injection pressure is greater than a predetermined threshold, and to otherwise command actuation of the secondary-fuel injection valve and not the main-fuel injection valve.

U.S. Pat. No. 9,695,764 Multi-Fuel Marine Engine Control System

A marine drive system includes an engine, a fuel system that provides at least two different fuels to the engine, and a fuel selection means for selecting a fuel type. A control unit accesses a set of fuel-specific operating parameters based on the selected fuel type and controls the engine based on the set of fuel-specific operating parameters.

U.S. Application No. 20050072471 Spare Fuel Tank in a Fuel Tank of a Vehicle

A spare fuel tank, installed inside a main fuel tank, having a reasonable volumetric capacity, of small box shape, and having a spare fuel suction pipe there from to the fuel injection pipe. The spare tank of this invention is manufactured at the same time with the main tank, therefore, does not need separate fuel supplying or specific piping connection with the main fuel tank owing to its place. Releasing of the fuel from inside the spare tank is activated by power on the switch connected to a solenoid valve blocking the spare fuel suction pipe.

U.S. Application No. 20080000916 Fuel Supply System for Use in Heavy Construction/Forest Equipment and Secondary Fuel Tanks Thereof A fuel supply system for supplying a fuel to an engine mounted on an upper frame of heavy construction/forest equipment is provided. The fuel supply system includes a junction tank unit for interflowing a fuel supply line which is connected to a lower end of a primary fuel tank and a fuel supply line which is connected to a lower end of a secondary fuel tank, the fuel supply lines being connected in parallel to each other, a water separator connected to the junction tank unit via a fuel supply line, a fuel supply line for supplying the fuel to an engine from the water separator, and a fuel recovery line for recovering a remaining fuel from the engine to the primary fuel tank.

U.S. Application No. 20090076705 Power Modulated, Dual Fuel, Small Displacement Engine Control System An engine capitalizes on the advantages of alternative fuels such as ethanol, E-85, and other alcohols, with a small displacement engine, two cylinders or more, and at least a divided fuel tank or alternatively two tanks. An electronic engine control module selects the fuel for operating conditions and delivers the fuel through separate injection systems. The module selects unleaded gasoline for starting, light load and light cruising conditions. Upon greater demands for engine power, the module adds or switches entirely to a secondary fuel such as alcohol, ethanol, E-85 or other ethanol/gasoline blends and reduces or eliminates the introduction of gasoline fuel. The secondary fuel provides more power than unleaded gasoline, thus reducing the engine displacement required for operating a vehicle under a variety of loads. The present invention seeks a substantial engine power increase, reduction in engine detonation, improved cold starting, re-evaluation of turbochargers, a decrease in gasoline consumption, and gasoline as the default fuel. The engine control system allows a small and efficient engine to deliver increased power upon demand over conventional automotive engines. The system modulates boost pressure when using a secondary fuel for operations at an increased power level. The power level increase occurs from the combination of lower stoichiometric, or higher octane, fuel and increased dynamic intake pressures. The system maintains engine power as low, with little or no intake boost pressure, and the gasoline, 85 octane minimum, is delivered through injectors. When higher power is demanded, the system increases boost pressure, at intake, while a secondary power fuel (ethanol, E-85, alcohol and the like), is injected.

However, none of these references addresses the issue of purging impure fuel from an engine before an extended period of non-use.

BRIEF SUMMARY OF THE INVENTION

In accordance with one aspect of the invention, a first embodiment of a multiple fuel tank purge system and method includes providing a pair of fuel tanks, including a main fuel tank for containing impure fuel and a separate, auxiliary fuel tank that contains commercial canned fuel. The engine runs on the impure fuel from the main fuel tank while the engine is in normal use, and then employs a shutdown cycle that switches to the commercial canned fuel from the auxiliary fuel tank for some pre-set time period. This arrangement allows the engine to be purged of the impure fuel (by burning the impure fuel during the shutdown cycle) and replaced by the commercial canned fuel before the engine is finally shut down. Then, even if the engine sits unused for an extended period of time, when the engine is started again, the fuel that remains within the fuel lines and the engine at the time of start up is the commercial canned fuel from the auxiliary fuel tank.

In one embodiment, the auxiliary fuel tank may be disposed within the main fuel tank (a 'tank within a tank'). In another embodiment, the tanks are housed separately as individual units, preferably with the main tank being significantly larger than the auxiliary tank. In another embodiment, the container for the commercial canned fuel may serve temporarily as the auxiliary tank, and is attached to a novel cap (replacing the cap that originally comes on the commercial pre-mixed fuel container) that includes a fuel line and means for attachment to either 1) the existing fuel line or 2) directly into the engine.

In yet another embodiment, the system may further include a 'shutdown button' or mechanism that allows the user to depress the button or otherwise actuate a shutdown cycle, causing the system to automatically switch from the main fuel tank to the auxiliary fuel tank for a preset time period (for instance, for 1-5 minutes) before shutting down the engine. The system may then switch back to the main tank prior to starting the engine again, or may switch back to the main tank shortly after starting the engine again, as desired.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of the present invention, showing a riding lawnmower having an auxiliary fuel tank that contains commercial canned fuel along with a main fuel tank containing impure fuel, and further including a valve that allows a user to alternate between the two fuel tanks;

FIG. 2 is a side view of one embodiment of a multiple fuel tank purge system including an auxiliary fuel tank having a cap that includes a fuel line and a one-way air-vent valve, a larger main fuel tank having a fuel line, and a T-valve connected to fuel lines from both tanks, and having a main fuel line extending from the T-valve to a combustible engine;

FIG. 3 is a side cross-sectional view of one embodiment of an auxiliary fuel tank having a novel cap over the opening thereof, wherein the cap includes a fuel line extending from the bottom of the auxiliary fuel tank and outwardly through the cap, and wherein an air vent is provided and operatively attached to the cap for allowing air to pass into the auxiliary tank as the commercial canned fuel flows outwardly through the fuel line;

FIG. 4 is a side view of another embodiment of a multiple fuel tank purge system, including a small auxiliary fuel tank and a large main fuel tank, fuel lines operatively attached to each fuel tank and connected at their distal ends to an electronic valve that may be actuated by the connected switch to alternate between the auxiliary fuel tank and the large main fuel tank; and FIG. 5 is a side cutaway view of another embodiment of a multiple fuel tank purge system, showing a main fuel tank for containing impure fuel and an auxiliary fuel tank containing commercial canned fuel, wherein the auxiliary fuel tank is housed within the main fuel tank, each fuel tank having fuel lines operatively connected thereto, and an electronic valve that may be actuated by the connected switch to alternate between the auxiliary fuel tank and the large main fuel tank.

DETAILED DESCRIPTION OF THE INVENTION

Overview

The present invention includes, in a first embodiment, a multiple fuel tank purge system 10 and method for a combustion engine, wherein a main fuel tank 12 contains impure fuel, and an auxiliary fuel tank 14 contains commercial canned fuel, as shown in FIGS. 2, 4 and 5. Essentially, the system 10 allows the engine to run on the impure fuel for the vast majority of the time while the engine is in use, and when a user is finished with the job at hand, the user initiates a shutdown cycle, wherein the flow of fuel from the main tank 12 is shut down and the fuel from the auxiliary tank 14 is allowed to run through the engine for a period of time that is long enough to burn off the impure fuel from the fuel lines 16 and engine and replace the impure fuel with the commercial canned fuel before shutting the engine down completely. This system 10 may be implemented in multiple ways, but in all events, the primary goal of the system is to prevent the engine from shutting down with any significant amount of impure fuel within the engine or any of its internal components (other than the main fuel tank 12 and the fuel line 16 leading out of the main fuel tank 12).

In one embodiment, the main fuel tank 12 and the auxiliary fuel tank 14 each include a fuel line 16 that is operatively connected to each one, and connect at a T-valve 18 that allows fuel to flow from one tank or the other, but not both simultaneously. The T-valve 18 may be manually operated by the user, as shown in FIG. 2, or may be actuated electronically, as shown in FIGS. 4 and 5. For the manually operated T-valve 18, a user may select the auxiliary tank 14 or the main tank 12 at any time by actuating the valve switch 20, either while the engine is running, or when the engine is shut off. Preferably, the user allows the engine to run from the main fuel tank 12 while the engine is in operation, and then at the end of the operation, the user manually switches the T-valve 18 so that fuel no longer flows from the main fuel tank 12, and instead flows from the auxiliary tank 14 for a few minutes before shutting down the engine. In this way, the engine may be stored, unused, for extended periods of time with the commercial canned fuel inside the engine, rather than the impure fuel. Although it may be unnecessary, the user may elect to start the engine with the T-valve 18 set to the auxiliary tank 14, and then, once the engine is running, the user may manually switch the T-valve 18 to the main tank 12 instead of the auxiliary tank 14 for longer-term operation.

Novel Fuel Tank Cap and Fuel Line

In another embodiment, the standard metal container in which the commercial canned fuel is sold may temporarily serve as the auxiliary fuel tank 14, which may be removably attached to the equipment (riding lawn mower 22, for instance) in any suitable manner, as shown in FIG. 1. In such a case, a novel fuel cap may be removably secured to the metal container (auxiliary fuel tank 14) and may include an air-intake valve 26, fuel line 16 extending from within the auxiliary tank 14 with a filter 30 at one end thereof, outwardly through the cap attached at the other end to either 1) the main fuel line 16 for the engine, or 2) directly to the engine itself. For instance, the fuel line 16 from the metal container cap may have a quick-connect device (like ones commonly found on small outboard boat motor fuel lines) at a distal end thereof for connection directly to the motor. Alternatively, the existing fuel line 16 for the engine may be fitted with a T-valve 18, and the distal end of the cap fuel line 16 may connect directly to the T-valve 18. The novel fuel cap 24 having the fuel line 16 and air intake vent 26 is shown in FIG. 3.

Tank Within A Tank

In another embodiment, as shown in FIG. 5, the auxiliary fuel tank 14 may be housed within the main fuel tank 12, which is particularly useful as an aftermarket item, or for replacing an existing single tank having the same overall size and shape. In this embodiment, the auxiliary tank 14 is significantly smaller than the main tank 12, and is separate from the main tank 14, so that the impure fuel from the main tank 12 does not mix directly with the commercial canned fuel from the auxiliary tank 14. As previously stated, each tank 12, 14 includes a fuel line 16 connected to a T-valve 18 (or other similar valve), so that fuel may flow from one tank or the other, but preferably not from both simultaneously.

Automated Shutdown Cycle Mechanism

In another embodiment, the dual fuel tanks 12, 14 may be operatively connected to an electronic shutdown system as shown in FIGS. 4 and 5, wherein a user simply presses a shutdown button or switch, and the system automatically switches the fuel feed from the main fuel tank 12 to the auxiliary fuel tank 14 for a predetermined period of time before shutting the engine down. The automated shutdown cycle mechanism may include an onboard computing device of any suitable type (computer chip, programmable logic controller, or any other suitable device for executing the shutdown cycle steps), and a shutdown button or switch 28 connected to the onboard computing device (which may be housed within the shutdown switch 28 itself), as shown in FIGS. 4 and 5. The T-valve 18 in this embodiment is electronically actuated by the onboard computing device when the user presses the shutdown button or switch 28. Optionally, the onboard computing device may switch the T-valve 18 back to the main fuel tank 12 after the engine has shut down completely, or it may allow the T-valve 18 to maintain the operable connection to the auxiliary fuel tank 14 until the engine is started again, and then switches back to the main tank 12 at some predetermined time period after the engine has been started.

It should be understood that the present dual fuel tank purge system 10 may be fitted to an existing engine retroactively, or may be installed new during the manufacturing process. It is contemplated that the novel fuel cap 24 with the fuel line 16 attached thereto may be sold separately from, or along with, the containers of commercial canned fuel that are currently widely available in hardware stores, small engine repair shops, large department stores, and the like. Such a kit might include the cap 24, fuel line 16, and quick-connection device (and/or a T-valve 18 that may be spliced into an existing fuel line 16 for an engine). It should also be understood that although the present system has been described as using impure fuel in the main tank 12 and commercial canned fuel in the auxiliary tank 14, other types of fuels may be used instead, so long as the auxiliary tank 14 includes the cleaner, more pure fuel that is less likely to damage the engine during extended periods of non-use, as compared to the alternative fuel used in the main fuel tank 12.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A retrofittable purge system for combustion engines, said purge system comprising:
    a combustion engine;
    a main fuel tank containing a first liquid fuel, said main fuel tank having a first fuel line operatively connected thereto for transporting said first liquid fuel to said combustion engine;
    an auxiliary fuel tank containing a second liquid fuel which is different from said first fuel and is ethanol-free, a second fuel line operatively connected thereto for transporting said second liquid fuel, wherein said first liquid fuel in said main fuel tank and said second liquid fuel in said auxiliary fuel tank are isolated from one another to prevent mixing of said first liquid fuel with said second liquid fuel; and
    a valve connected to said first fuel line and said second fuel line for receiving said first liquid fuel from said main fuel tank and for receiving said second liquid fuel from said auxiliary fuel tank, and a third fuel line extending outwardly from said valve and is operatively connected to said combustion engine in order to provide fuel for running said combustion engine, wherein said valve includes a switch for allowing said liquid fuels to flow therethrough from either said main fuel tank or said auxiliary fuel tank, and wherein said valve prevents said first liquid fuel and said second liquid fuel from flowing therethrough simultaneously.

2. The purge system for combustion engines set forth in claim 1, wherein said first liquid fuel contains ethanol.

3. The purge system for combustion engines set forth in claim 1, wherein said valve is manually operated.

4. The purge system for combustion engines set forth in claim 1, wherein said valve is actuated electronically.

5. The purge system for combustion engines set forth in claim 4, wherein said valve is operatively connected to and controlled by an onboard computing device.

6. The purge system for combustion engines set forth in claim 5, wherein said onboard computing device is programmed to execute a shutdown cycle, wherein said valve is switched to allow said second liquid fuel to flow therethrough and to prevent said first liquid fuel from flowing therethrough while said combustion engine is running for a predetermined period of time, and wherein said onboard computing device shuts down said engine after said predetermined period of time.

7. The purge system for combustion engines set forth in claim 6, wherein said onboard computing device is further programmed to actuate said valve to receive said first liquid fuel from said main fuel tank after said combustion engine has shut down.

8. The purge system for combustion engines set forth in claim 1, wherein said main fuel tank and said auxiliary fuel tank are both contained within a single housing.

9. A cap that is attachable to a disposable fuel container comprising:
    a top portion and a side portion, wherein an inner face of said side portion is circular and
    includes a threaded portion for engaging a threaded mouth of a fuel container;
    a fuel line having a first end and a second end, said fuel line extending through a hole in
    said top portion of said cap so that said first end of said fuel line extends into said fuel container when said cap is screwed onto said fuel tank mount; and
    said second end of said fuel line having a quick-connect device for removable operative attachment to a combustion engine, so that said fuel container, said cap, and said fuel line may be detached from said combustion engine while said cap and said fuel line remain attached to said disposable fuel container.

10. The cap set forth in claim 9, further including a one-way valve for allowing air to flow into said fuel container when said cap is screwed onto said mouth of said fuel container, but which does not allow air or fuel to flow outwardly in an opposite direction therethrough.

11. A method for purging a combustion engine, said method comprising the steps of:
    providing a combustion engine;
    providing a main fuel tank containing a first liquid fuel, said main fuel tank having a first fuel line that is operatively connected to said combustion engine for transporting said first liquid fuel;
    providing an auxiliary fuel tank containing a second liquid fuel which is different from said first fuel and is ethanol-free, said auxiliary tank having a second fuel line that is operatively connected to said combustion engine for transporting said second liquid fuel to said combustion engine;
    running said combustion engine with said first liquid fuel;
    shutting off flow of said first liquid fuel from said main fuel tank while said combustion engine is running and allowing said second liquid fuel to flow from said auxiliary fuel tank so that said engine begins running on said second liquid fuel;
    allowing said combustion engine to run on said second liquid fuel for a predetermined period of time; and
    shutting down said combustion engine after said first liquid fuel has been exhausted from said combustion engine.

12. The method set forth in claim 11, further including the step of providing an electronically actuated valve connected to said first and second fuel lines for allowing flow of liquid fuel from either said main fuel tank or said auxiliary fuel tank, but which prevents fuel flow from both tanks simultaneously.

13. The method set forth in claim 12, further including the steps of:
   providing an onboard computing device operatively connected to said valve and said combustion engine; and
   programming said onboard computing device to execute said steps of:
   a) actuating said valve to allow only said second liquid fuel to flow from said auxiliary fuel tank so that said combustion engine begins running on said second liquid fuel for said predetermined period of time; and
   b) shutting down said combustion engine after said first liquid fuel has been exhausted from said combustion engine.

\* \* \* \* \*